United States Patent
Seng et al.

(10) Patent No.: US 7,392,439 B2
(45) Date of Patent: Jun. 24, 2008

(54) CALCULATION OF DATA FREQUENCIES IN RECORDING MEDIA

(75) Inventors: Edmun ChianSong Seng, Singapore (SG); DetHau Wu, Singapore (SG); UttHeng Kan, Singapore (SG); LinNah Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 774 days.

(21) Appl. No.: 10/434,608

(22) Filed: May 9, 2003

(65) Prior Publication Data

US 2004/0225933 A1 Nov. 11, 2004

(51) Int. Cl.
*G06F 11/00* (2006.01)
(52) U.S. Cl. .................................. 714/704; 714/769
(58) Field of Classification Search ................ 714/704, 714/769, 770, 42, 817, 53
See application file for complete search history.

(56) References Cited

U.S. PATENT DOCUMENTS

| | | | | |
|---|---|---|---|---|
| 4,901,004 A | * | 2/1990 | King | 324/66 |
| 5,430,581 A | * | 7/1995 | Moribe et al. | 360/31 |
| 5,657,176 A | * | 8/1997 | Moribe et al. | 360/31 |
| 5,737,519 A | | 4/1998 | Abdelnour | |
| 5,999,352 A | | 12/1999 | Teck et al. | 360/48 |
| 6,084,732 A | | 7/2000 | Lee | 360/53 |
| 6,182,250 B1 | | 1/2001 | Ng et al. | 714/704 |
| 6,212,142 B1 | * | 4/2001 | Shoji et al. | 369/47.3 |
| 6,222,877 B1 | * | 4/2001 | Govindarajan | 375/224 |
| 6,249,392 B1 | | 6/2001 | Sacks | |
| 6,260,257 B1 | | 7/2001 | Emo et al. | 29/603.09 |
| 6,445,653 B1 | | 9/2002 | Ng et al. | 369/47.1 |
| 6,505,320 B1 | * | 1/2003 | Turk et al. | 714/755 |
| 6,574,797 B1 | * | 6/2003 | Naegeli et al. | 725/120 |
| 6,636,817 B2 | * | 10/2003 | Fioravanti | 702/75 |
| 6,735,029 B2 | * | 5/2004 | Seng et al. | 360/46 |
| 2002/0036852 A1 | | 3/2002 | Leow | |
| 2002/0054443 A1 | | 5/2002 | Seng | |
| 2002/0128787 A1 | | 9/2002 | Seng | |
| 2004/0125753 A1 | * | 7/2004 | Mahany et al. | 370/254 |

OTHER PUBLICATIONS

Nan-Hsiung Yeh et al., "Optimal Head Design and Characterization from a Media Perspective," IEEE Transactions on Magnetics, vol. 35., No. 2, Mar. 1999, pp. 776-781.

* cited by examiner

*Primary Examiner*—Jacques Louis Jacques
*Assistant Examiner*—Fritz Alphonse
(74) *Attorney, Agent, or Firm*—Alan G. Rego; Westman, Champlin & Kelly, P.A.

(57) ABSTRACT

A computer process establishes data frequencies for recording data in zones of a zone bit recording medium in a disc drive. At least three data points are identified for each zone correlating data frequencies and corresponding bit error rates, and a slope of a curve between each two data points is calculated. The slopes are averaged, and the data frequency is calculated based on the average slope. If a difference between the average and default slopes exceeds a first threshold value, or if a spread of the slopes exceeds a second threshold value, the data frequency is calculated based on the average slope and the default slope. In one embodiment, each of the three data points is generated by recording data in the zone at each of three selected data frequencies, reading the recorded data, and calculating bit error rates based on the recorded and read data.

19 Claims, 4 Drawing Sheets

SLOPE CALCULATION

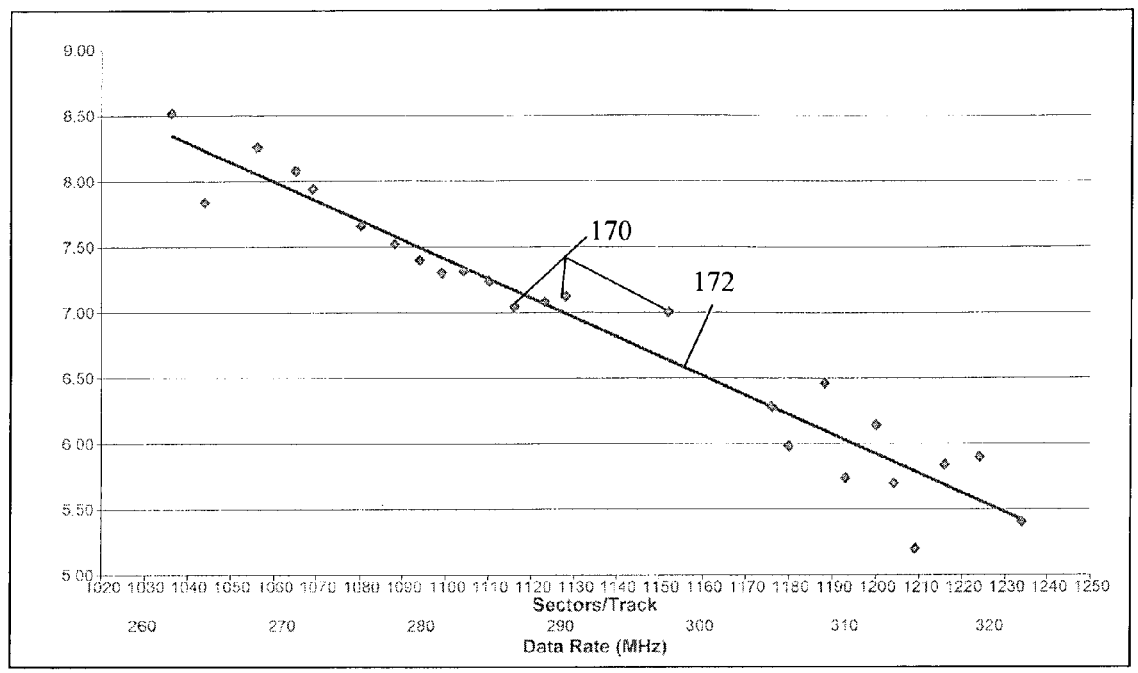
FIG. 4 - ERROR RATE VS DATA FREQUENCY
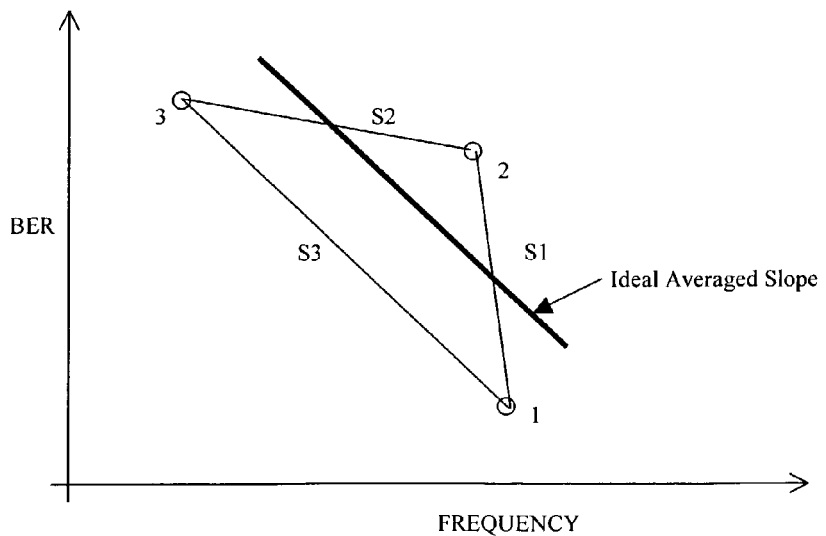
FIG. 5 - SLOPE CALCULATION

CALCULATION OF DATA FREQUENCIES IN RECORDING MEDIA

FIELD OF THE INVENTION

This invention relates to variable data frequencies in a recording medium.

BACKGROUND OF THE INVENTION

Areal density of magnetic recording in hard disc data storage devices is a product of track density and bit recording density. Drive storage capacity can be increased without increasing the number or size of recording discs by increasing areal density, such as by increasing track and/or bit density. Track density can be increased by decreasing track width and/or spacing between tracks. Bit density can be increased by increasing the number of bits per inch recorded along the length of each track, such as by increasing data frequency for the track. However, there are practical limits to increasing bit density. More particularly, increasing the track and/or bit density decreases the signal-to-noise ratio of the recovered data signals on readback, leading to unacceptably increased data errors.

Bit density is often expressed as the number of bits per inch (BPI) along the length of a track. Because the tracks on a recording disc are circular and are concentrically arranged, the length of a track at an outer radius is significantly greater than the length of a track at an inner radius. Consequently, for a given recording frequency, bit density is greater at an inner radius than at outer radius. Thus, the BPI of each track is related to the data frequency and the radial location of the track.

Ordinarily, disc drives are manufactured to meet some set of specifications that define the performance of the drive. One element of the specifications relates to the bit error rate (BER). The bit error rate is related to bit density and is a measure of the performance of the head/medium combination in recording and recovering data. The BER is expressed as a number of recorded bits successfully recovered per error (e.g., $10^X$). By convention, the bit error rate is expressed simply as X, so a bit error rate of 7.8 is equivalent one error in $10^{7.8}$ recovered bits. Thus greater BERs represent better head/medium performance.

Typically, increases in bit density (BPI) adversely affects the error rate, reducing the BER number. More particularly, higher BPIs require more closely packed data bits along the length of the track, thereby degrading the signal-to-noise ratio and decreasing the BER number. Therefore, one goal of disc drive performance is to establish the BPI to meet a specified minimum BER.

One well-known technique to increase bit density is to segment the disc surface into radial zones and record data at higher frequencies in outer zones. This is known as "zone bit recording" and results in a bit density that is substantially the same in each radial zone. Consequently, the BER is substantially the same over the entire disc, and within stated specifications.

However, head/disc performance is not equal for all discs of a storage medium. Manufacturing variances of both the heads and the discs often result in slight variances of the BER between head/disc combinations of a multi-surface storage device. Consequently, an improvement to zone bit recording, particularly useful in disc drives having plural recording discs (i.e., disc packs), is to adjust the BPI for each disc to an optimal value based upon a target BER. This concept, known as variable bits per inch (VBPI) selects a recording frequency for each disc based on the data transfer capability of the particular head/disc combination.

In practice, the BER might vary between zones for a given head/disc combination having a given BPI. Manufacturing tolerances may result in slight differences in performance of a head/disc combination over the various zones of the disc, resulting in different BERs between zones. As a result, some disc drives failed qualification tests at manufacture simply because one or a few zones failed the BER test at the established BPI. An examination of the failed disc drives revealed that further adjustment of the BPI of the failed zones and of other passing zones could result in a passing disc drive.

However, it has not been economically feasible to test the BER of each zone of each disc surface of each disc drive manufactured to optimize the BPI. Therefore, there is a need for a technique to select the optimal data frequency that meets a minimal BER threshold without requiring an extensive test of each zone of each disc for each copy of the model of disc drive. The present invention provides a solution to this and other problems, and offers other advantages over the prior art.

SUMMARY OF THE INVENTION

According to a first embodiment of the present invention, a computer process establishes data frequencies for recording data in zones of a zone bit recording medium in a disc drive. At least three data points are identified for each zone, each data point correlating a data frequency to a bit error rate. The slope of a curve is calculated between each pair of data points. The slopes are averaged, and the data frequency for the selected zone is calculated based on the average slope.

In one form, the at least three data points are generated by selecting a data frequency and measuring a bit error rate for each of at least three data points. At least three slopes are calculated by pairing each data point with each other data point, and calculating a slope of a curve between the data points of each pair of data points.

In preferred forms of the computer process, a default slope is set based on a default data frequency. If a difference between the average slope and the default slope exceeds a first threshold value, the data frequency for the selected zone is calculated based on the average and default slopes.

Also preferably, a spread of the slopes is calculated. If the spread exceeds a second threshold value, the data frequency for the selected zone is calculated based on the average and default slopes.

In preferred embodiments, the process is performed for each zone on the medium and the data frequency calculated for each zone is stored in a table accessible by the disc drive.

In another embodiment, the invention is manifest in a computer useable medium having a computer readable program embodied therein for causing a computer to perform the steps of the computer process.

Other features and benefits that characterize embodiments of the present invention will be apparent upon reading the following detailed description and review of the associated drawings.

BRIEF DESCRIPTION OF THE DRAWINGS

FIG. 4 is a graph illustrating the relationship between the error rate and data frequency in a head/media combination.

FIG. 5 is a plot illustrating a calculation of a relationship between error rate and data frequency useful in carrying out the present invention.

DETAILED DESCRIPTION OF ILLUSTRATIVE EMBODIMENTS

Figure 1:
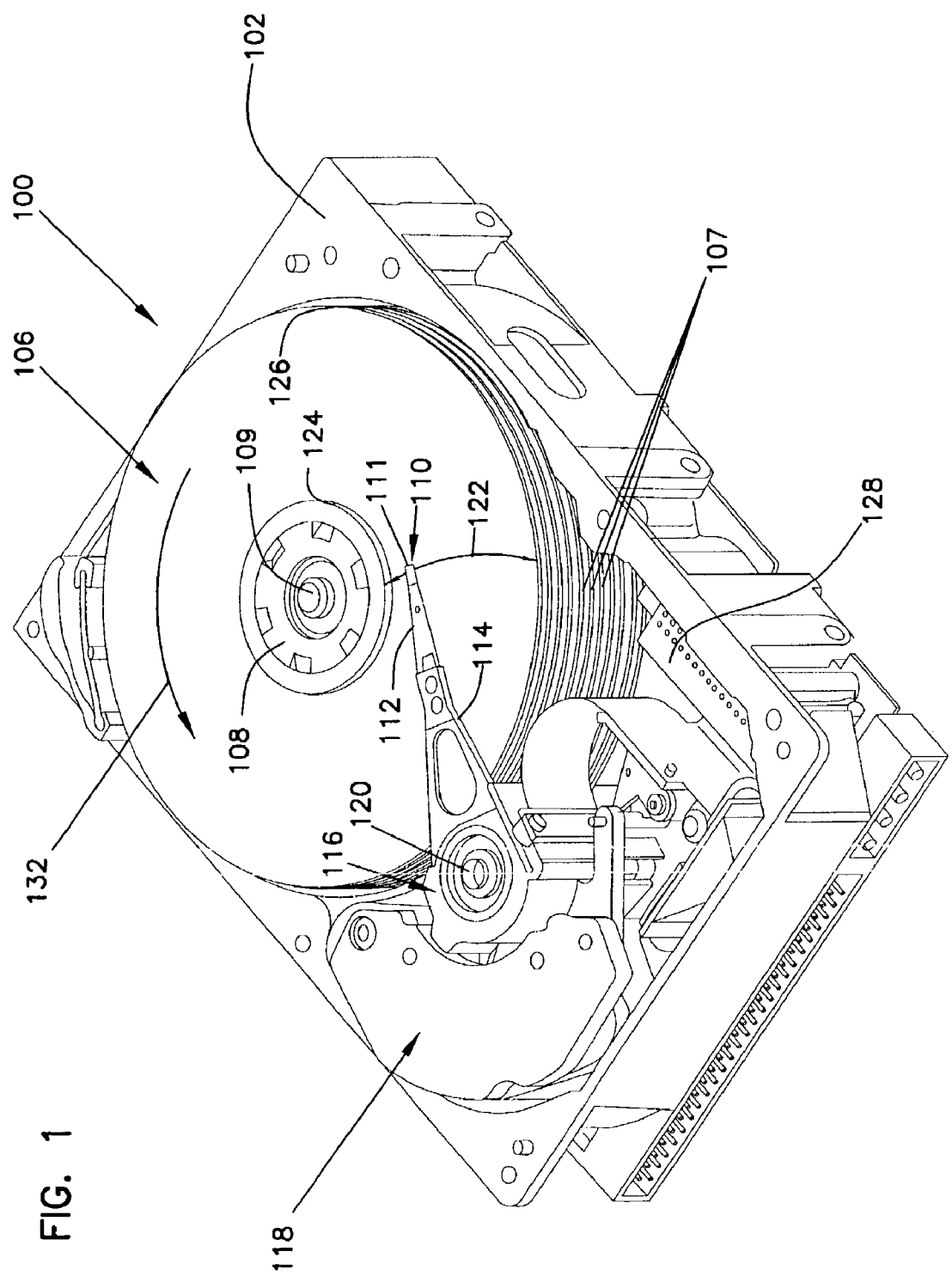
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual magnetic recording discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator, and its attached sliders 110, about a pivot shaft 120. Rotation of actuator 116 moves the heads along an arcuate path 122 to position the heads over a desired data track between a disc inner diameter 124 and a disc outer diameter 126.

Voice coil motor 118 is operated by position signals from servo electronics included on circuit board 128, which in turn are based on error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs.

Figure 2:
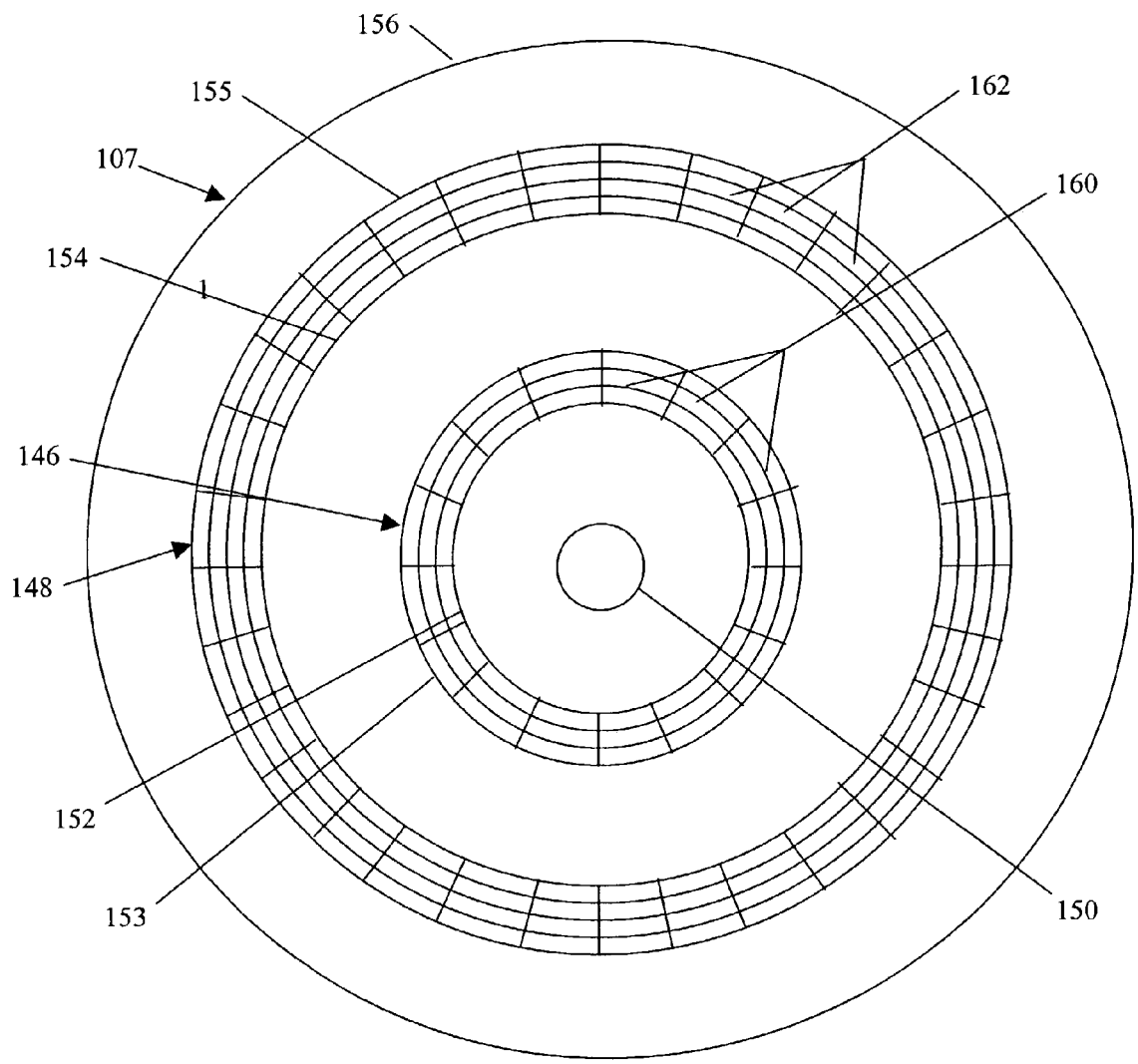
FIG. 2 is a plan view of a disc medium for the disc drive illustrated in FIG. 1 illustrating a layout of zones and sectors of a disc.

FIG. 2 illustrates the layout of a recording surface of a typical magnetic recording disc 107 to which the present invention may be applied. The recording surface includes a plurality of concentric tracks 150-156, with track 150 at an inner radius and track 156 at an outer radius of disc 107. The length of track 156 is significantly greater than that of track 150. The tracks are segmented into a plurality of zones 146, 148, each containing a plurality of tracks. Thus, zone 146 contains tracks 152 . . . 153 and zone 148 contains tracks 154 . . . 155.

Each track in each zone is further segmented into a plurality of sectors such that the number of sectors is the same for all tracks in a given zone. Thus, each track 152 . . . 153 in zone 146 contains a selected number of sectors 160 and each track 154 . . . 155 in zone 148 contains a different selected number of sectors 162. Each sector 160, 162 contains the same number of bits. The number of sectors in a given zone is directly proportional to the data frequency. Consequently, the data frequency and number of sectors for a given zone is constant for all tracks within a zone, but is different from zone to zone. Thus as shown in FIG. 2, there are a greater number of sectors in zone 148 than in zone 146.

(Those skilled in the art will recognize that sectors 160, 162 represent data sectors and that the discs may contain embedded servo sectors between data sectors 160, 162 to provide servo data to the disc drive. Alternatively, the data sectors may be contiguous, in which case servo data may be recorded on one disc surface dedicated to that purpose).

The present invention provides an in-situ technique to characterize the BER performance of a disc drive over a range of frequency to identify optimal operating BER values for each zone. More particularly, BER data is collected over a large range of data frequencies to obtain an averaged curve of BER vs. frequency for each zone of each drive. The amount of data required, however, is minimal, as we have found that three data points is adequate. Also, we prefer that the BER between the three data points be separated by about one order, ±0.4. A sector-per-track-per-BER order (STO) data value is identified based on the slope of a curve between each pair of data points. An STO spread and average STO are calculated and a final STO value is obtained. A new data frequency is established for the zone based on the final STO value. The process is repeated for each zone and the data frequencies are stored in the disc drive to establish the data frequency for the zones. Instead of requiring 20 or more data points, as in prior BER tests, the present invention requires only three data points for each zone for each disc drive. Therefore, it is economically practical to apply the process to each production disc drive.

Figure 3:
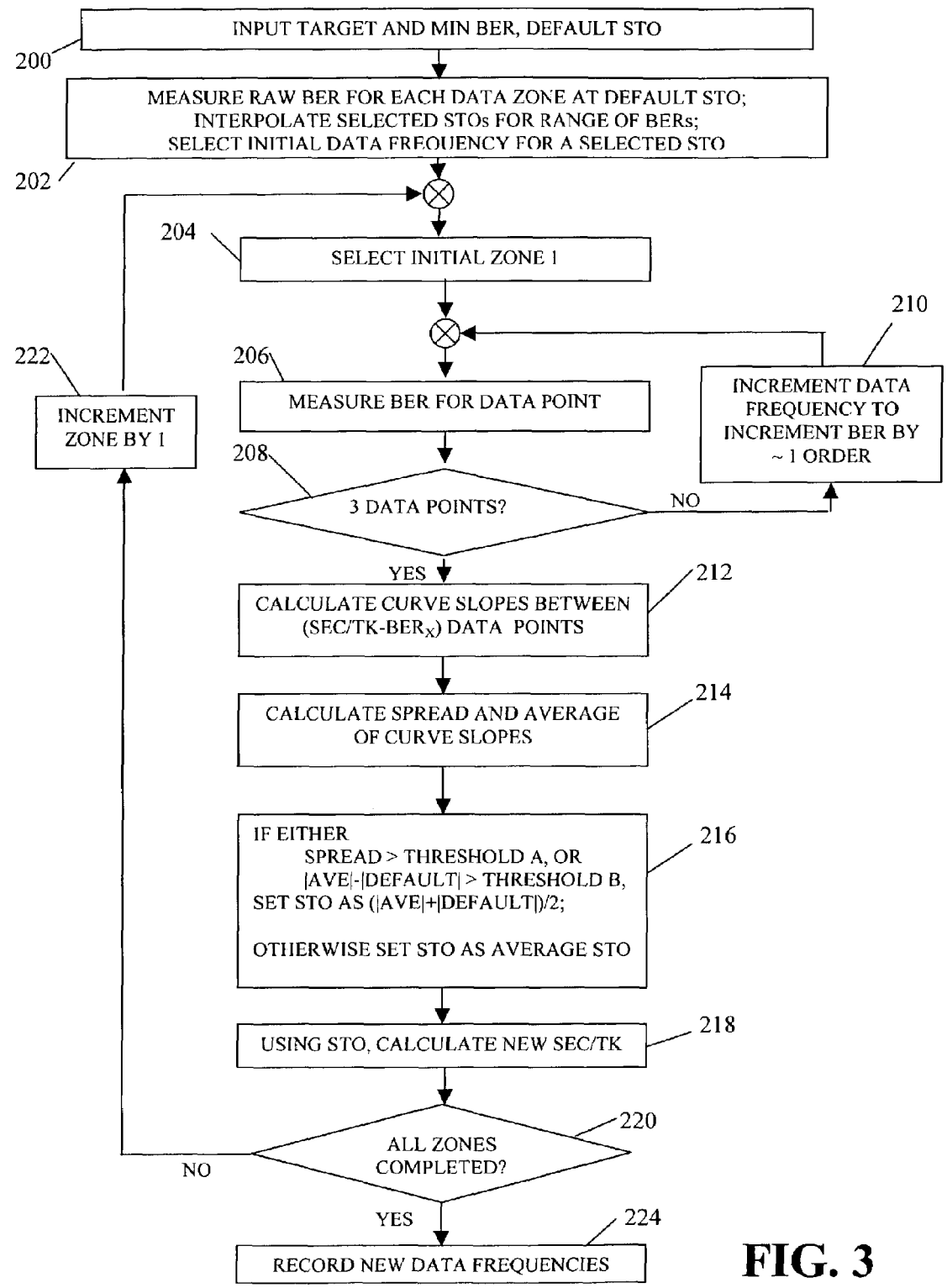
FIG. 3 is a flow diagram illustrating a process of establishing an optimal bit density for a zone on the medium illustrated in FIG. 2.

FIG. 3 is a flow chart of the process of establishing the data frequency for the zones of a disc drive surface in accordance with the present invention. The process is carried out in a computer under the control of a computer program containing code that causes the computer to execute and perform the steps of the process. The computer program may be stored on the disc medium 107 (FIG. 1) during manufacture and is used to establish the data frequencies for each zone on each disc surface of the disc drive during manufacture. A table of data frequencies is stored on the disc medium 107 at a location reserved for that purpose, and is used to operate the drive at the specified data frequencies. In preferred embodiments, the program containing the code that executes the process is removed from the disc drive upon completion of manufacture. In some embodiments the program may be retained on the disc drive for re-optimizing the disc drive during scheduled maintenance. Any data or programs on the disc drive may need to be backed up and re-loaded.

At step 200, target and minimum BER data, identified from the disc drive specifications, are input to the computer, and default STO values for each zone are also input. The default STO values are optimized sector/track values derived from a small population of models of the drive being manufactured. More particularly, as shown in FIG. 4, multiple data points are identified for each zone at different data frequencies (MHz) to identify a BER associated with each data frequency. These data points are used to derive a default STO value for the respective zone. The several default STO values are input to the computer at step 200.

With reference again to FIG. 3, at step 202 a raw BER is measured for each data zone using the respective default STO value and a range of three BERs is selected based to encompass the target BER, with the selected BERs being about one order apart. For example, Table 1 illustrates a zone 1 having a default STO representing a data frequency of 1099 (expressed in number of sectors per track). The raw BER (for the data frequency of 1099 sectors/track) is measured at 7.4. Since the target BER is 7.8, a range of BERs is selected to encompass the target BER of 7.8, in this case a range including BERs of 6, 7 and 8. Using the default STO and raw BER, STOs are interpolated that will approximately result in each of the selected BERs. The corresponding data frequencies are identified and a first data frequency is selected. In the example of sector 1, data frequencies are identified for each selected BER of 6, 7 and 8, and one of the data frequencies (for example, the data frequency associated with the selected BER=6) is selected.

(As will be more fully understood hereinafter, it is not necessary that the interpolated STOs actually result in the selected BERs. Instead, the STOs are selected from an extension of the raw BER/default STO data, and may result in selection of data frequencies whose corresponding BERs are somewhat different from the selected BERs.)

At step 214, the average STO and the spread of the STO are calculated. More particularly, with reference to Table 2, and particularly to the first line identified for zone 1, the absolute value of the slope of curve S1 is 130 sectors per track per order. Similarly, the absolute value of the slope of curve S2 is 48 STO and the absolute value of the slope of curve S3 is 69 STO. The STO spread is the difference between the slopes of S1 and S2, plus the difference between the slopes of S2 and S3, plus the difference between the slopes of S1 and S3.

TABLE 1

Application of Process
Target BER = 7.8, Min. BER = 7.5

| | | STO Raw Data | | | | | | | | |
|---|---|---|---|---|---|---|---|---|---|---|
| | Init | Raw | 1 | | 2 | | 3 | | Final | Final | Final |
| Zone | Sec/Tk | BER | Sec/Tk | BER | Sec/Tk | BER | Sec/Tk | BER | STO | Sec/Tk | BER |
| 1 | 1099 | 7.4 | 1193 | 6.2 | 1128 | 6.7 | 1056 | 8.2 | 75 | 1069 | 7.9 |
| 2 | 1069 | 6.6 | 1104 | 5.7 | 1044 | 7.0 | 992 | 8.1 | 51 | 1008 | 7.7 |
| 3 | 1028 | 6.9 | 1080 | 5.2 | 1021 | 6.7 | 968 | 7.7 | 49 | 987 | 7.5 |
| 4 | 1008 | 6.4 | 1028 | 5.5 | 979 | 7.1 | 921 | 8.0 | 49 | 946 | 7.8 |
| 5 | 972 | 6.7 | 1008 | 5.7 | 960 | 7.0 | 905 | 8.1 | 47 | 921 | 7.7 |
| 6 | 946 | 6.9 | 992 | 5.5 | 936 | 6.5 | 888 | 7.8 | 49 | 905 | 7.5 |
| 7 | 900 | 6.6 | 928 | 6.1 | 888 | 7.0 | 828 | 7.8 | 56 | 828 | 7.9 |
| 8 | 864 | 7.2 | 928 | 5.2 | 864 | 7.2 | 822 | 7.8 | 53 | 835 | 7.5 |
| 9 | 816 | 6.8 | 864 | 6.1 | 806 | 7.0 | 748 | 7.7 | 66 | 740 | 7.7 |
| 10 | 777 | 6.8 | 822 | 5.9 | 768 | 7.0 | 704 | 8.0 | 56 | 720 | 7.6 |
| 11 | 740 | 5.7 | 720 | 6.5 | 672 | 7.2 | 624 | 7.9 | 60 | 600 | 7.9 |
| 12 | 662 | 6.7 | 699 | 5.9 | 648 | 6.9 | 600 | 7.6 | 54 | 600 | 7.7 |
| 13 | 617 | 7.8 | 648 | 5.7 | 604 | 6.7 | 552 | 8.0 | 42 | 576 | 8.1 |

The process commences at step 204 with the selection of an initial zone of the disc drive. In the example given, each surface of the disc drive has thirteen radial zones, numbered 1 through 13 starting with the innermost zone. For purposes of explanation, zone 1 is selected as the initial zone. At step 206, the BER is measured for the selected data frequency. For example, if the data frequency is selected so that the number of sectors per track is 1193, the BER might be measured as 6.2, as shown in Table 1. Thus, a first data point is established of 1193 sectors per track with a BER of 6.2.

BER measurement of step 206 is performed in a manner well known in the art. More particularly, data are recorded in the zone under test at the selected data frequency using the write portion of the head. The recorded data are then read (recovered) using the read portion of the head, and the recovered data are then compared to the original data. Differences between the recovered data and the original data are a measure of the error rate, from which the BER can be calculated.

At step 208, a determination is made as to whether three data points have been obtained. If not, the data frequency is incremented at step 210 to a data frequency that will result in a BER approximately one above the BER of the first data point. In the example, a data frequency having 1128 sectors per track is selected and the BER is measured at 6.7. The process continues to iterate through steps 210 and 206 until three data points are obtained. Thus, as shown in Table 1, the third data point is at a sectors-per-track value at 1056 and a measured BER value of 8.2. With three data points obtained, the process continues to step 212.

At step 212, the slope of the curve between each pair of data points is calculated. FIG. 5 illustrates an example of data points 1, 2 and 3, with slopes of the lines S1, S2 and S3 representing an STO between points 1 and 2, 2 and 3, and 1 and 3, respectively.

Hence, the STO spread for zone 1 is 164. Similarly, the average STO is the average of the three STOs, and is calculated as 82.

TABLE 2

Calculation of Final STO

| Zone | Default STO | S1 | S2 | S3 | Spread | Ave STO | Final STO |
|---|---|---|---|---|---|---|---|
| 1 | 69 | 130 | 48 | 69 | 164 | 82 | 75 |
| 2 | 56 | 46 | 47 | 47 | 2 | 47 | 51 |
| 3 | 53 | 39 | 53 | 45 | 28 | 46 | 49 |
| 4 | 53 | 31 | 64 | 43 | 66 | 46 | 49 |
| 5 | 52 | 37 | 50 | 43 | 26 | 43 | 47 |
| 6 | 53 | 56 | 37 | 45 | 38 | 46 | 49 |
| 7 | 53 | 44 | 75 | 59 | 62 | 59 | 56 |
| 8 | 54 | 32 | 70 | 41 | 76 | 48 | 51 |
| 9 | 59 | 64 | 83 | 73 | 38 | 73 | 66 |
| 10 | 57 | 49 | 64 | 56 | 30 | 56 | 56 |
| 11 | 51 | 69 | 69 | 69 | 0 | 69 | 60 |
| 12 | 50 | 51 | 69 | 58 | 36 | 59 | 54 |
| 13 | 42 | 44 | 40 | 42 | 8 | 42 | 42 |

At step 216, if the spread (164 in the example) is greater than a predetermined threshold value A, then the final STO value is calculated as one-half the sum of the absolute values of the average STO and the default STO:

$$\text{If Spread} > A, \quad STO_{FINAL} = \frac{|STO_{AVE}| + |STO_{DEFAULT}|}{2}. \quad (1)$$

In one example, threshold A for the spread is established as 40. Therefore, in the example where the spread of 169 exceeds the threshold of 40, the final STO is 75:

$$\frac{82+69}{2}=75.$$

Zone 2 illustrates an example of a second condition for modifying the STO value based on a difference between the average STO and the default STO. More particularly, in step 216, the final STO is one-half of the sum of the absolute values of the average and default STOs if the difference between the absolute values of the default and average STO values is greater than threshold B. In one example, threshold B is established at 5, so the absolute value of the difference between the default and average STOs is 9 (56−47=9), which exceeds threshold B of 5. Consequently, the final STO is 51:

$$\frac{56-47}{2}=51.$$

If neither the spread nor the difference between the default and average STO values meets the respective thresholds, then the average STO value is taken as the final STO value at step 216. Thus, in zone 10, the spread of 30 does not exceed the threshold of 40, and the difference between the average and default STO values of 1 does not exceed the threshold value of 5, so the average STO value of 56 is the final STO value. Similarly, in zone 13, the average STO of 42 is the final STO value.

At step 218, the data frequency values are derived from the final STO, and the final BER may be measured based on the final data frequency. More particularly, a final number of sectors per track is derived from the final STO, and converted to a data frequency. The final BER may be measured, as shown in Table 1.

At step 220, a determination is made as to whether all zones of the surface have been completed, and if not, the process continues to step 222 to increment the zone number by one and continue from step 204. If, at step 220, all zones have been completed for the disc surface, the new data frequencies are recorded at step 224 in a management area of disc 107, or in a disc drive controller for the disc drive 100, to establish the data recording frequency for zones of the disc surface. The process then is repeated for each other disc surface of the disc drive.

The data frequencies are recorded at step 224 as a digital table, expressing the data in the example of Table 3.

TABLE 3

| Zone | Sec/Tk |
|---|---|
| 1 | 1060 |
| 2 | 1008 |
| 3 | 987 |
| 4 | 946 |
| 5 | 921 |
| 6 | 905 |
| 7 | 828 |
| 8 | 835 |
| 9 | 740 |
| 10 | 720 |
| 11 | 600 |

TABLE 3-continued

| Zone | Sec/Tk |
|---|---|
| 12 | 600 |
| 13 | 576 |

While Table 3 presents the data frequency in terms of sectors per track, it may be more convenient in some cases to record the data frequency in Hertz or some other suitable measurement basis. In typical environments, a table like Table 3 correlates data frequencies for each zone of each recording surface of the disc drive.

The present invention is preferably carried out at manufacture of the disc drive by carrying out the computer process by an on-board processor on circuit board 128 (FIG. 1), programmed for the purpose, and loading the table of data frequencies into the disc drive for access during start-up of the disc drive by the user. Alternatively, the invention may be embodied on a computer readable medium, such as a floppy disc, and comprise a computer program containing computer readable code to cause a computer to carry out the process of establishing data frequencies for zones on a disc medium. This form of the invention is particularly useful for periodic maintenance of the disc drive by personnel to re-configure the disc drive for optimal performance.

In either case, the table may be located in the disc drive controller, or at a location on one or more of the discs dedicated to management functions of the disc drive. At start-up of the disc drive, the controller accesses the table to identify the data frequency at which to record or retrieve data to/from the respective zone of the respective disc.

It will be appreciated that the data frequency of a given zone may vary between various disc surfaces to meet optimal performance goals. Typically, the arrangement of zones is the same on all disc surfaces of a multi-disc or multi-surface disc drive. Thus, all tracks of any given cylinder of tracks in a disc drive are in corresponding zones of the respective disc surface. Unlike variable bits per inch (VBPI) techniques in the past where recording bit densities were selected as one of a limited number of predetermined possible densities (hence, the recording frequency for a given zone on a disc surface was selected as one of a limited number of possible frequencies for the corresponding zones of all disc surfaces), the present invention allows a wide range of densities (and hence, of recording frequencies for each corresponding zone) for the disc surfaces and disc drives.

Although the present invention has been described with reference to magnetic disc drives, those skilled in the art will recognize that the present invention may be practiced with other system modifications, including but not limited to optical disc drives and re-writable optical disc drives, as well as systems employing other rotatable media technologies.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for technique while maintaining substantially the same functionality without departing from the scope and spirit of the present invention. Thus, while the invention is described in connection with magnetic disc drives, the process of optimizing data frequencies might be applied to other rotating data storage and/or retrieval devices, such as optical disc drives and recordable optical disc drives, without departing from the scope and spirit of the invention.

What is claimed is:

1. A computer process for establishing data frequencies comprising:
   identifying at least three data points, each correlating a data frequency and a corresponding bit error rate;
   calculating an average slope of a plurality of curves, each curve extending between respective two of the at least three data points;
   calculating a data frequency based on the average slope; and
   storing the calculated data frequency for use in a data recording operation.

2. The process of claim 1, further including:
   setting a default slope based on a default data frequency, and the data frequency is calculated by:
   setting a first threshold value,
   calculating a difference between the average slope and the default slope,
   calculating the data frequency based on the average slope and the default slope if the difference exceeds the first threshold value, and
   calculating the data frequency based on the average slope if the difference does not exceed the first threshold value.

3. The process of claim 2, wherein the calculation of the average slope includes:
   summing the slopes of the plurality of curves to derive a spread of the slopes, and
   the data frequency is further calculated by:
   setting a second threshold value,
   calculating the data frequency based on the average slope and the default slope if the spread exceeds the second threshold value, and
   calculating the data frequency based on the average slope if the difference does not exceed the first threshold value and the spread does not exceed the second threshold value.

4. The process of claim 1, further including:
   setting a default slope based on a default data frequency,
   summing the slopes of the plurality of curves to derive a spread of the slopes,
   and the data frequency is further calculated by:
   setting a threshold value,
   calculating the data frequency based on the average slope and the default slope if the spread exceeds the threshold value, and
   calculating the data frequency based on the average slope if the spread does not exceed the threshold value.

5. The process of claim 1, wherein each data point is identified by:
   recording data on a recording medium at a selected data frequency,
   reading the data, and
   calculating a bit error rate based on the recorded and read data.

6. The process of claim 1, wherein the at least three data points are identified by identifying first, second and third data points each correlating a data frequency and a corresponding bit error rate, and the average slope is calculated by:
   calculating a slope of a first curve between a first and a second data point of the at least three data points;
   calculating a slope of a second curve between the first and a third data point of the at least three data points;
   calculating a slope of a third curve between the second and the third data point of the at least three data points;
   averaging the slopes of the first, second and third curves to derive an average slope.

7. The process of claim 6 for establishing data frequencies for at least first and second recording zones of a recording medium, the process including:
   applying the calculated data frequency to the first zone as a first data frequency,
   identifying fourth, fifth and sixth data points, each of the fourth, fifth and sixth data points correlating a data frequency and a corresponding bit error rate for the second zone,
   calculating a slope of a fourth curve between the fourth and fifth data points,
   calculating a slope of a fifth curve between the fourth and sixth data points,
   calculating a slope of a sixth curve between the fifth and sixth data points,
   averaging the slopes of the fourth, fifth and sixth curves to derive a second average slope,
   calculating a second data frequency for the second zone based on the second average slope, and
   storing a representation of the first and second data frequencies in a table.

8. The process of claim 7 further including:
   setting a default slope based on a default data frequency for the second zone, and the second data frequency is calculated by:
   setting a first threshold value,
   calculating a difference between the second average slope and the default slope,
   calculating the second data frequency based on the second average slope and the default slope if the difference exceeds the first threshold value, and
   calculating the second data frequency based on the second average slope if the difference does not exceed the first threshold value.

9. The process of claim 8 further including:
   summing the slopes of the fourth, fifth and sixth curves to derive a spread of slopes, and the second data frequency is calculated by:
   setting a second threshold value,
   calculating the second data frequency based on the second average slope and the default slope if the spread exceeds the second threshold value, and
   calculating the second data frequency based on the second average slope if the spread does not exceed the second threshold value.

10. The process of claim 7 further including:
    setting a default slope based on a default data frequency for the second zone,
    summing the slopes of the fourth, fifth and sixth curves to derive a spread of slopes, and the second data frequency is calculated by:
    setting a threshold value,
    calculating the second data frequency based on the second average slope and the default slope if the spread exceeds the second threshold value, and
    calculating the second data frequency based on the second average slope if the spread does not exceed the second threshold value.

11. The process of claim 7 wherein each of the first, second and third data points are identified by:
    recording first data in the first zone of the recording medium at a first selected data frequency, reading the first data, and calculating a first bit error rate based on the recorded and read first data, and wherein each of the fourth, fifth and sixth data points are identified by:

recording second data in the second zone of the recording medium at a second selected data frequency, reading the second data, and calculating a second bit error rate based on the recorded and read data.

12. A computer storage medium having a computer readable program embodied therein for causing a computer to establish data frequencies, the computer readable program comprising:

first computer readable code for causing the computer to calculate at least three data points, each correlating a data frequency and a corresponding bit error rate;

second computer readable code for causing the computer to calculate a first slope of a curve between a first and a second of the at least three data points, to calculate a second slope of a curve between the first and a third of the at least three data points, and to calculate a third slope of a curve between the second and the third of the at least three data points;

third computer readable code for causing the computer to calculate an average slope based on the first, second and third slopes; and fourth computer readable code for causing the computer to calculate the data frequency based on the average slope.

13. The computer storage medium of claim 12, further including:

fifth computer readable code for causing the computer to calculate a default slope based on a default data frequency, and the fourth computer readable code includes:

computer readable code for causing the computer to calculate a difference between the average slope and the default slope, computer readable code for causing the computer to calculate the data frequency based on the average slope and the default slope if the difference between the average and default slopes exceeds a first threshold value, and computer readable code for causing the computer to calculate the data frequency based on the average slope if the difference between the average and default slopes does not exceed the first threshold value.

14. The computer storage medium of claim 13, further including:

sixth computer readable code for causing the computer to sum the first, second and third slopes to derive a spread of the slopes, and the fourth computer readable code further includes:

computer readable code for causing the computer to calculate the data frequency based on the average slope and the default slope if the spread exceeds a second threshold value, and computer readable code for causing the computer to calculate the data frequency based on the average slope if the difference between the average and default slopes does not exceed the first threshold value and the spread does not exceed the second threshold value.

15. The computer storage medium of claim 12, further including:

fifth computer readable code for causing the computer to calculate a default slope based on a default data frequency, sixth computer readable code for causing the computer to sum the first, second and third slopes to derive a spread of the slopes, and the fourth computer readable code further includes:

computer readable code for causing the computer to calculate the data frequency based on the average slope and the default slope if the spread exceeds a threshold value, and computer readable code for causing the computer to calculate the data frequency based on the average slope if the spread does not exceed the threshold value.

16. The computer storage medium of claim 12, wherein the first computer readable code includes:

computer readable code for causing the computer to generate each of the first, second and third data points, by recording data to a recording medium at a selected data frequency, reading data from the recording medium, and calculating a bit error rate from the recorded and read data.

17. The computer storage medium of claim 12 for establishing data frequencies for a plurality of recording zones of a recording medium of a disc drive, the computer medium further including:

fifth computer readable code for causing the computer to iteratively repeat execution of the first, second, third and fourth computer readable code for each zone of the recording medium, and sixth computer readable code responsive to the calculation of the data frequency for each zone to cause the computer to store a table accessible by the disc drive containing the calculated data frequencies.

18. The computer storage medium of claim 17, further including:

seventh computer readable code for causing the computer to calculate a default slope for each zone based on a respective default data frequency, and the fourth computer readable code includes:

computer readable code for causing the computer to calculate a difference between the respective average slope and the respective default slope, computer readable code for causing the computer to calculate the respective data frequency based on the respective average slope and the respective default slope if the difference between the respective average and respective default slopes exceeds a first threshold value, and computer readable code for causing the computer to calculate the respective data frequency based on the respective average slope if the difference between the respective average and respective default slopes does not exceed the first threshold value.

19. The computer storage medium of claim 18, further including:

eighth computer readable code for causing the computer to sum the first, second and third slopes for each zone to derive a respective spread of the slopes, and the fourth computer readable code further includes:

computer readable code for causing the computer to calculate the respective data frequency based on the respective average slope and the respective default slope if the respective spread exceeds a second threshold value, and computer readable code for causing the computer to calculate the respective data frequency based on the respective average slope if the difference between the respective average and respective default slopes does not exceed the first threshold value and the respective spread does not exceed the second threshold value.

* * * * *

UNITED STATES PATENT AND TRADEMARK OFFICE
CERTIFICATE OF CORRECTION

PATENT NO. : 7,392,439 B2  Page 1 of 1
APPLICATION NO. : 10/434608
DATED : June 24, 2008
INVENTOR(S) : Seng et al.

It is certified that error appears in the above-identified patent and that said Letters Patent is hereby corrected as shown below:

Column 10
Line 26 Insert --,-- after claim 7

Line 39 Insert --,-- after claim 8

Line 50 Insert --,-- after claim 7

Line 63 Insert --,-- after claim 7

Column 12
Line 17 Insert --,-- after claim 12

Signed and Sealed this

Fourteenth Day of July, 2009

JOHN DOLL
*Acting Director of the United States Patent and Trademark Office*